US008675980B2

(12) United States Patent
Liege et al.

(10) Patent No.: US 8,675,980 B2
(45) Date of Patent: Mar. 18, 2014

(54) METHOD AND SYSTEM FOR REDUCING UPDATE FREQUENCY OF IMAGE-PROCESSING MEANS

(75) Inventors: Bruno Liege, Boulogne (FR); Frederic Guichard, Paris (FR)

(73) Assignee: DO Labs, Boulogne (FR)

( * ) Notice: Subject to any disclaimer, the term of this patent is extended or adjusted under 35 U.S.C. 154(b) by 1104 days.

(21) Appl. No.: 10/482,413

(22) PCT Filed: Jun. 5, 2002

(86) PCT No.: PCT/FR02/01910
§ 371 (c)(1),
(2), (4) Date: Jun. 8, 2004

(87) PCT Pub. No.: WO03/007236
PCT Pub. Date: Jan. 23, 2003

(65) Prior Publication Data
US 2004/0234152 A1 Nov. 25, 2004

(30) Foreign Application Priority Data

Jul. 12, 2001 (FR) .................................. 01 09291
Jul. 12, 2001 (FR) .................................. 01 09292

(51) Int. Cl.
*G06K 9/40* (2006.01)
(52) U.S. Cl.
USPC ........... 382/254; 382/167; 382/274; 382/275; 382/307
(58) Field of Classification Search
USPC ......... 382/100, 167, 254, 307, 325, 275, 274; 348/211.1, 211.2, 231.3
See application file for complete search history.

(56) References Cited

U.S. PATENT DOCUMENTS 5,353,392 A 10/1994 Luquet et al.
5,461,440 A * 10/1995 Toyoda et al. ............... 396/311

(Continued)

FOREIGN PATENT DOCUMENTS

EP 1 045 317 10/2000
JP 10083024 A * 3/1998

(Continued)

OTHER PUBLICATIONS

NISO, "NISO draft standard. Data dictionary—technical metadata for digital still images—working draft, 1.0", XP002224028, pp. 1-40 Jul. 5, 2000.*

(Continued)

*Primary Examiner* — Eric Rush
(74) *Attorney, Agent, or Firm* — Oblon, Spivak, McClelland, Maier & Neustadt, L.L.P.

(57) ABSTRACT

A method and a system for reducing update frequency of an image processor, in particular a software and/or a component. The image processor enables modifying the quality of digital images derived from and addressed to a set of appliances. The set of appliances includes an image capture device and/or an image scanning device. The image processor uses formatted data dependent on at least one variable, associated with defects of at least one appliance of the set of appliances. The formatted data includes parameters of at least a parameterable model dependent on the variables. The formatted data enables establishing a correspondence, in particular by a correspondence table, between part of the variables and identifiers. The identifiers enable determining the value of the variable corresponding to an identifier taking into account the identifier and the image.

21 Claims, 3 Drawing Sheets

(56) References Cited

U.S. PATENT DOCUMENTS

| | | | |
|---|---|---|---|
| 5,606,365 A * | 2/1997 | Maurinus et al. | 348/222.1 |
| 5,694,484 A * | 12/1997 | Cottrell et al. | 382/167 |
| 5,818,523 A * | 10/1998 | Ban | 348/224.1 |
| 6,094,221 A * | 7/2000 | Andersion | 348/231.6 |
| 6,115,104 A * | 9/2000 | Nakatsuka | 355/40 |
| 6,273,535 B1 * | 8/2001 | Inoue et al. | 347/3 |
| 6,323,934 B1 * | 11/2001 | Enomoto | 355/40 |
| 6,571,248 B1 * | 5/2003 | Kusama | 707/100 |
| 6,693,668 B1 * | 2/2004 | May et al. | 348/247 |
| 6,937,370 B1 * | 8/2005 | Nitta et al. | 358/518 |
| 6,952,223 B2 * | 10/2005 | Terashita | 348/222.1 |
| 7,098,943 B2 * | 8/2006 | Shibutani | 348/211.1 |
| 2001/0009590 A1 * | 7/2001 | Holm | 382/162 |
| 2001/0014180 A1 * | 8/2001 | Ejiri et al. | 382/275 |
| 2004/0218803 A1 * | 11/2004 | Chanas et al. | 382/141 |

FOREIGN PATENT DOCUMENTS

| | | |
|---|---|---|
| JP | H10-083024 | 3/1998 |
| JP | H11-146308 | 5/1999 |
| WO | 01/35052 | 5/2001 |

OTHER PUBLICATIONS

NISO: "NISO draft standard. Data dictionary—technical metadata for digital still Images—working draft, 1.0", XP002224028, pp. 1-40 Jul. 5, 2000.

Japan Electronic Industry Development Association: "Digital still camera image file format stanard (exchangeable image file format for digital still cameras: exif) version 2.1" pp. 1-166, XP002224029 Jun. 12, 1998.

U.S. Appl. No. 10/483,253, filed Jan. 12, 2004, Chauville et al.
U.S. Appl. No. 10/482,419, filed Jan. 12, 2004, Chauville et al.
U.S. Appl. No. 10/483,252, filed Jan. 12, 2004, Chauville et al.
U.S. Appl. No. 10/483,322, filed Jan. 12, 2004, Liege et al.
U.S. Appl. No. 10/483,495, filed Jan. 12, 2004, Chanas et al.
U.S. Appl. No. 10/483,496, filed Jan. 12, 2004, Chanas et al.
U.S. Appl. No. 10/483,494, filed Jan. 12, 2004, Liege et al.
U.S. Appl. No. 10/483,497, filed Jan. 12, 2004, Liege et al.
U.S. Appl. No. 12/097,886, filed Jun. 18, 2008, Liege.
U.S. Appl. No. 12/158,129, filed Aug. 22, 2008, Liege.
U.S. Appl. No. 12/097,893, filed Jun. 18, 2008, Liege.

* cited by examiner

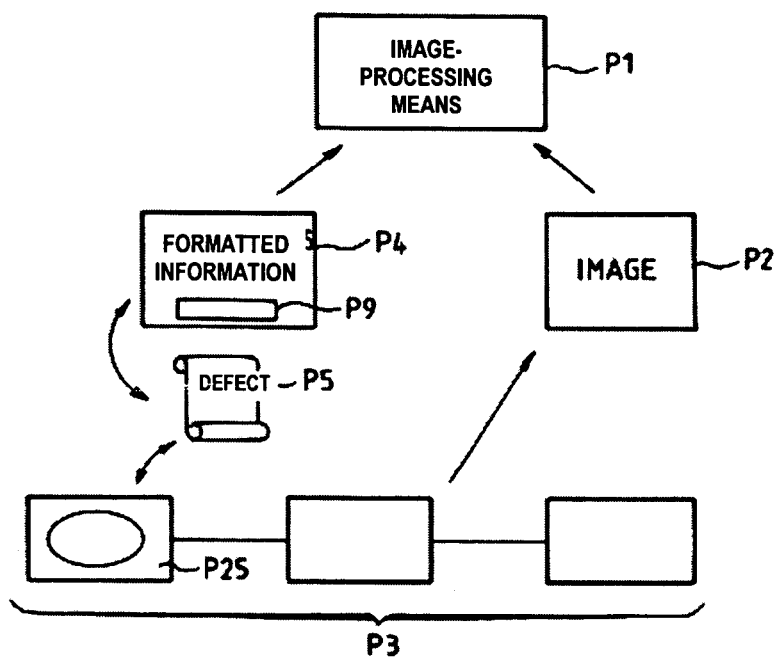
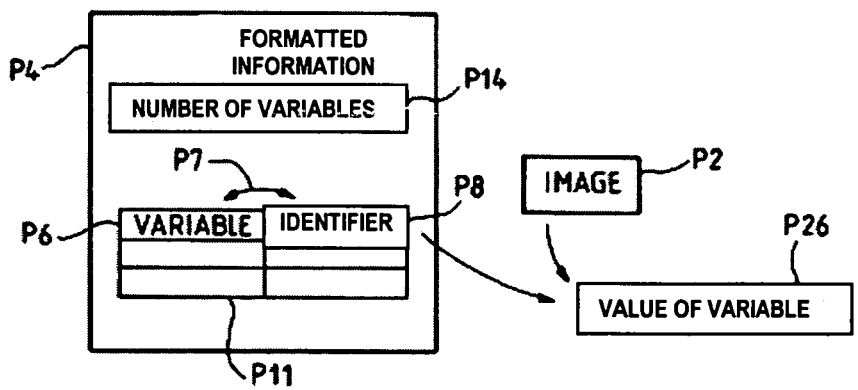

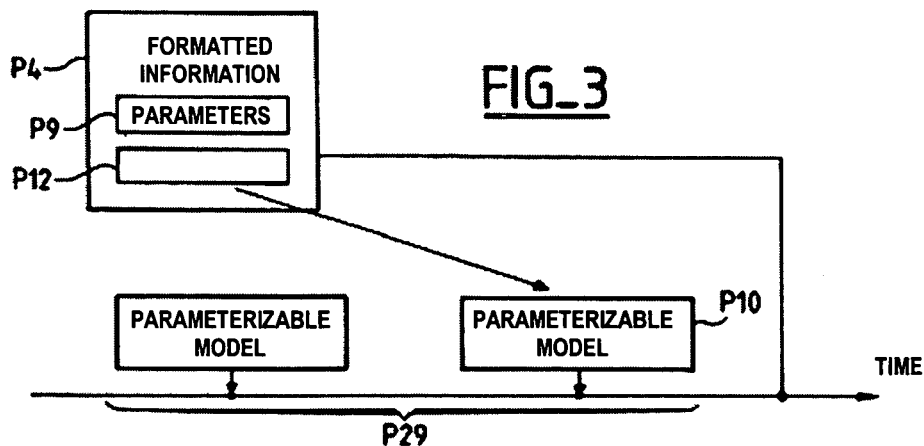
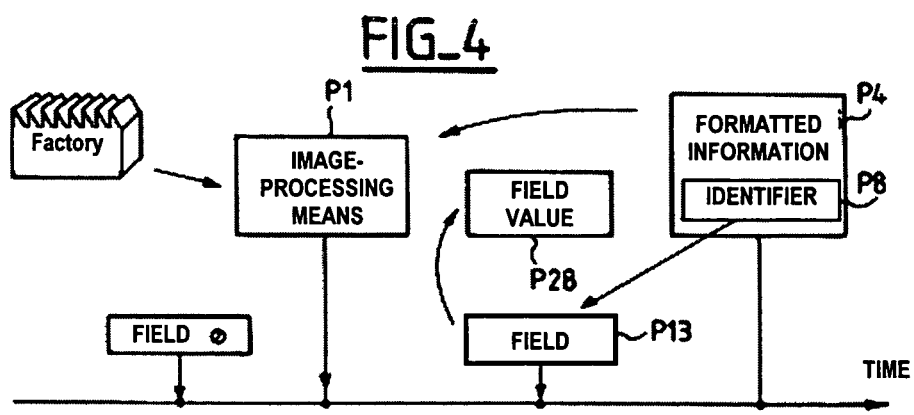
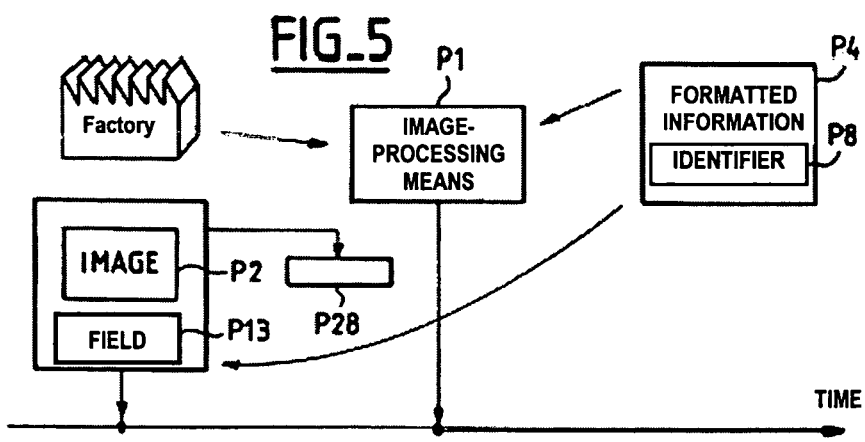

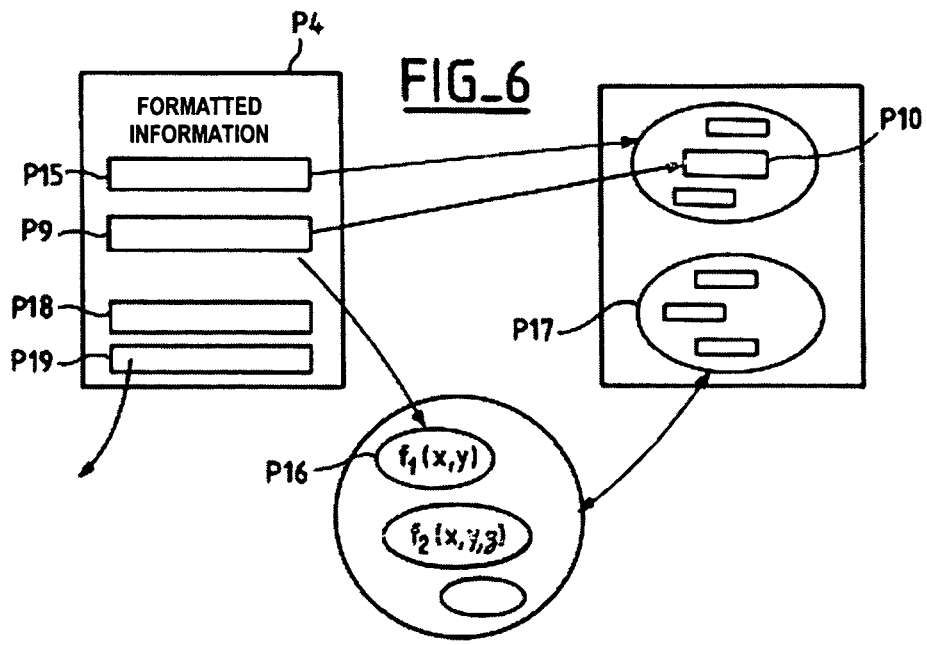
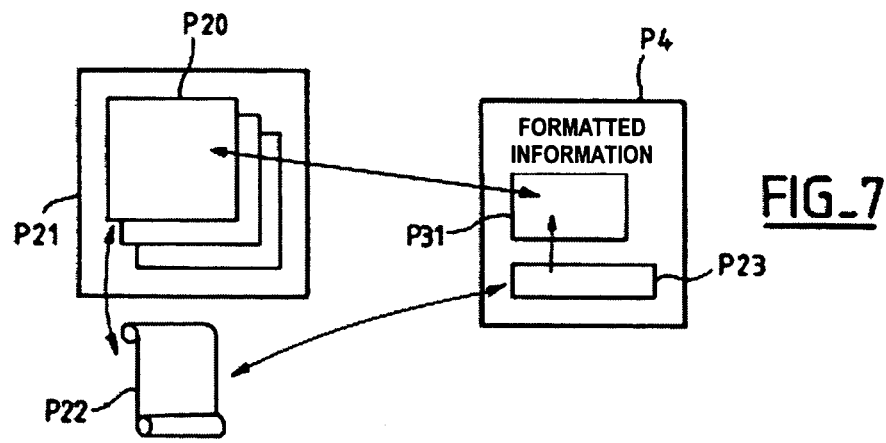
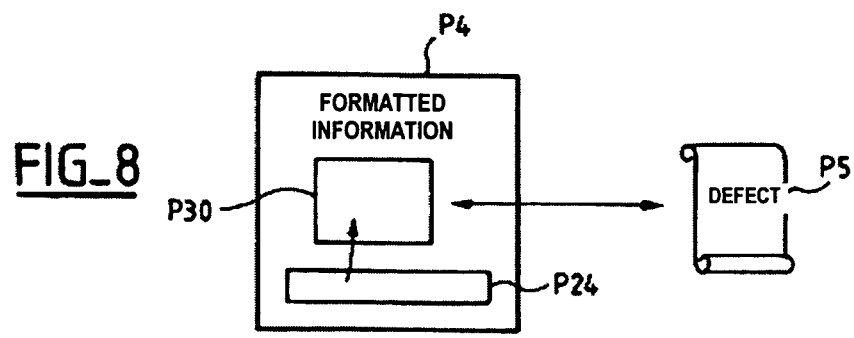

METHOD AND SYSTEM FOR REDUCING UPDATE FREQUENCY OF IMAGE-PROCESSING MEANS

PREAMBLE OF THE DESCRIPTION FIELD IN QUESTION, PROBLEM POSED

The present invention relates to a method and a system for reducing the frequency of updating of image-processing means.

SOLUTION

Method

The invention relates to a method for reducing the frequency of updating of image-processing means, especially software and/or a component. The image-processing means make it possible to modify the quality of digital images derived from or addressed to an appliance chain. The appliance chain includes at least one image-capture appliance and/or at least one image-restitution appliance. The image-processing means employ formatted information related to the defects of at least one appliance of the appliance chain. The formatted information depends on at least one variable. The formatted information makes it possible to establish a correspondence between one part of the variables and of the identifiers. By means of the identifiers it is possible to determine the value of the variable corresponding to the identifier by taking the identifier and the image into account. It results from the combination of technical features that it is possible to determine the value of a variable, especially in the case in which the physical significance and/or the content of the variable are known only after distribution of image-processing means. It also results from the combination of technical features that the time between two updates of the correction software can be spaced apart. It also results from the combination of technical features that the various economic players that produce appliances and/or image-processing means can update their products independently of other economic players, even if the latter radically change the characteristics of their product or are unable to force their client to update their products. It also results from the combination of technical features that a new functionality can be deployed progressively by starting with a limited number of economic players and pioneer users.

Preferably, the method according to the invention is such that the formatted information includes parameters of at least one parameterizable model depending on variables.

Preferably, the method according to the invention is such that the correspondence between the part in question of the variables and the identifiers is established by a correspondence table.

Compatibility of Parameterizable Models

The parameterizable models may vary in a manner reflecting the successive updates of the image-processing means. Preferably in the case of this alternative embodiment of the method according to the invention, the formatted information additionally includes identification elements for the successively employed parameterizable models. It results from the combination of technical features that it is possible to identify the fraction of formatted information related to parameterizable models that existed prior to distribution of a version of the image-processing means.

Downward Compatibility of the Variables

The identifier may designate a field whose physical significance and content were defined, especially in a format of the Exif type, after the distribution of the image-processing means. Preferably in the case of this alternative embodiment of the method according to the invention, the image-processing means make it possible to obtain the value of fields whose physical significance and/or value were defined after distribution of the image-processing means. The image-processing means make it possible to determine the value of the variable corresponding to the identifier in question by using the correspondence.

Upward Compatibility of the Variables

The identifiers may designate fields whose physical significance and content were defined, especially in a format of the Exif type, prior to the distribution of the image-processing means. The images may have an existence prior to the distribution of the image-processing means. Preferably in the case of this alternative embodiment of the method according to the invention, the image-processing means make it possible to obtain the value of fields designated by the identifiers from data related to the image. The image-processing means make it possible to determine the value of the variable corresponding to the identifier in question by using the correspondence. It results from the combination of technical features that the image-processing means can modify the quality of images produced before distribution of the processing means.

Preferably, the method according to the invention is such that the formatted information additionally includes the number of variables.

The formatted information may include parameters of a plurality of types of parameterizable models. Preferably, in the case of this alternative embodiment of the method according to the invention, the parameters of a given type of parameterizable model are identified by an identification element for the type of parameterizable model. The formatted information additionally includes the identification element for the type of parameterizable model. It results from the combination of technical features that it is possible to choose the type of parameterizable model at the moment of production of the formatted information.

Preferably, according to the invention, the method is such that the values of the parameters of the parameterizable model make it possible to identify a mathematical function of the variables. The mathematical function identified in this way makes it possible to modify image quality as a function of specified values of the variables. It also results from the combination of technical features that it is possible to calculate the mathematical function at the moment of modification of image quality, for the type of parameterizable model used during production of the formatted information.

Preferably, the method according to the invention is such that at least one of the types of parameterizable model, referred to hereinafter as generic parameterizable model, is such that the values of the parameters of the generic parameterizable model make it possible to identify any mathematical function whatsoever of the variables. The mathematical function identified in this way makes it possible to modify image quality as a function of specified values of the variables. It results from the combination of technical features that it is possible to produce formatted information related to the defects of an appliance of arbitrary complexity.

Preferably, the method according to the invention is such that the formatted information additionally includes data-processing programs and/or links to data-processing programs. It results from the combination of technical features that it is possible to distribute image-processing means that call data-processing subprograms contained in the formatted information making it possible to modify image quality, in particular by processing defects defined after distribution of the processing means.

The invention also relates to a method designed to reduce the frequency of updating of processing means with which the quality of at least one color plane of a color image can be modified. The color plane is characterized by a specified color. Preferably in the case of this method according to the invention, the formatted information additionally includes data related to the specified color. It results from the combination of technical features that the image-processing means can calculate the color plane for a specified color defined after distribution of the image-processing means.

Preferably, the method according to the invention is such that the data related to the specified color additionally make it possible to determine the fraction of formatted information that can be appropriately employed to modify the quality of the color plane. It results from the combination of technical features that the processing means can apply a particular processing operation, especially processing of a blurring level, for a specified color defined after distribution of the image-processing means.

The invention also relates to a method designed to reduce the frequency of updating of processing means with which image quality can be modified depending on a plurality of defects. Preferably in the case of this method according to the invention, the formatted information additionally includes data related to at least one specified defect.

Preferably, according to the invention, the data related to the specified defect additionally make it possible to determine the fraction of formatted information that can be appropriately employed to modify image quality depending on the specified defect. It results from the combination of technical features that the processing means can modify image quality by using formatted information related to defects, at least one defect of which was defined after distribution of the processing means.

System

The invention relates to a system for reducing the frequency of updating of image-processing means, especially software and/or a component. The image-processing means make it possible to modify the quality of digital images derived from or addressed to an appliance chain. The appliance chain includes at least one image-capture appliance and/or at least one image-restitution appliance. The image-processing means employ formatted information related to the defects of at least one appliance of the appliance chain. The formatted information depends on at least one variable. The formatted information makes it possible to establish a correspondence between one part of the variables and of the identifiers. By means of the identifiers it is possible to determine the value of the variable corresponding to the said identifier by taking the said identifier and the said image into account.

Preferably, the system according to the invention is such that the formatted information includes parameters of at least one parameterizable model depending on variables.

Preferably, the system according to the invention is such that the correspondence between the part in question of the variables and the identifiers is established by a correspondence table.

Compatibility of Parameterizable Models

The parameterizable models may vary in a manner reflecting the successive updates of the image-processing means. Preferably in the case of this alternative embodiment of the system according to the invention, the formatted information additionally includes identification elements for the successively employed parameterizable models.

Downward Compatibility of the Variables

The identifier may designate a field whose physical significance and content were defined, especially in a format of the Exif type, after the distribution of the image-processing means. Preferably in the case of this alternative embodiment of the system according to the invention, the image-processing means make it possible to obtain the value of fields whose physical significance and/or value were defined after distribution of the image-processing means.

Upward Compatibility of the Variables

The identifiers may designate fields whose physical significance and content were defined, especially in a format of the Exif type, prior to the distribution of the image-processing means. The images may have an existence prior to the distribution of the image-processing means. Preferably in the case of this alternative embodiment of the system according to the invention, the image-processing means make it possible to obtain the value of fields designated by the identifiers from data related to the image.

Preferably, according to the invention, the formatted information additionally includes the number of variables.

The formatted information may include parameters of a plurality of types of parameterizable models. The parameters of a type of parameterizable model are identified by an identification element for the type of parameterizable model. Preferably in the case of this alternative embodiment of the system according to the invention, the formatted information additionally includes the identification element for the type of parameterizable model.

Preferably, according to the invention, the system is such that the values of the parameters of the parameterizable model make it possible to identify a mathematical function of the variables. The mathematical function identified in this way makes it possible to modify image quality as a function of specified values of the variables.

Preferably, in the system according to the invention, at least one of the types of parameterizable model, referred to hereinafter as generic parameterizable model, is such that the values of the parameters of the generic parameterizable model make it possible to identify any mathematical function whatsoever of the variables.

The mathematical function identified in this way makes it possible to modify image quality as a function of specified values of the variables.

Preferably, in the system the system according to the invention, the formatted information additionally includes data-processing programs and/or links to data-processing programs.

The invention also relates to a system designed to reduce the frequency of updating of processing means with which the quality of at least one color plane of a color image can be modified. Preferably in the case of this alternative embodiment of the method according to the invention, the color plane is characterized by a specified color. The formatted information additionally includes data related to the specified color.

Preferably, according to the invention, the data related to the specified color additionally make it possible to define the fraction of formatted information that can be appropriately employed to modify the quality of the color plane.

The invention also relates to a system designed to reduce the frequency of updating of processing means with which image quality can be modified depending on a plurality of defects. Preferably in the case of this alternative embodiment of the system according to the invention, the formatted information additionally includes data related to at least one specified defect.

Preferably, according to the invention, the data related to the specified defect additionally make it possible to determine the fraction of formatted information that can be appropriately employed to modify image quality depending on the specified defect.

DETAILED DESCRIPTION

Other characteristics and advantages of the invention will become apparent upon reading of the description of alternative embodiments of the invention, provided by way of indicative and non-limitative examples, and of:

FIG. 1, which illustrates an appliance chain P3 containing in particular an appliance P25, an image P2 derived from appliance chain P3, formatted information P4 related to the defects P5 of appliance P25, and image-processing means P1 employing formatted information P4 and image P2, FIG. 2, which illustrates an image P2, formatted information P4 depending on at least one variable P6 and making it possible to establish a correspondence P7 between variable P6 and an identifier P8, and a value P26 of variable P6 obtained by taking into account identifier P8 and image P2, FIG. 3, which illustrates formatted information P4 including parameters P9 and identification elements P12 for parameterizable models, making it possible to identify a parameterizable model P10 among the parameterizable models P29 successively employed in the course of time, FIG. 4, which illustrates image-processing means P1 distributed before the physical significance or the content or a field P13 was defined, formatted information P4 containing an identifier P8, and a field value P28 determined by image-processing means P1, FIG. 5, which illustrates image-processing means P1 commercialized after the existence of image P2 and after the physical significance or the content of a field P13 was defined, formatted information P4 containing an identifier P8, and a field value P28 determined by image-processing means P1, FIG. 6, which illustrates formatted information P4 containing identification elements P15 for the type of parameterizable model, data-processing programs P18, links P19 to data-processing programs, parameters P9 of a parameterizable model P10, a generic parameterizable model P17, and a mathematical function P16, FIG. 7, which illustrates a color image P21 composed of at least one color plane P20 characterized by a specified color P22, formatted information P4 containing data P23 related to the specified color, making it possible to determine a fraction P31 of the formatted information related to the specified color, FIG. 8, which illustrates formatted information P4 containing data P24 related to a specified defect, making it possible to determine the fraction P30 of the formatted information related to the defect.

APPLIANCE

Referring in particular to FIG. 1, a description will be given of the concept of appliance P25. Within the meaning of the invention, an appliance P25 may be in particular:

an image-capture appliance, such as a disposable photo appliance, a digital photo appliance, a reflex appliance, a scanner, a fax machine, an endoscope, a camcorder, a surveillance camera, a game, a camera integrated into or connected to a telephone, to a personal digital assistant or to a computer, a thermal camera or an echographic appliance, an image-restitution appliance, such as a screen, a projector, a television set, virtual-reality goggles or a printer, an appliance, including its installation, such as a projector, a screen and the manner in which they are positioned, the positioning of an observer relative to a restitution appliance, which introduces parallax errors in particular, a human being having vision defects, such as astigmatism, an appliance which it is hoped can be emulated, to produce images having, for example, an appearance similar to those produced by an appliance of the Leica brand, an image-processing device, such as zoom software, which has the edge effect of adding blurring, a. virtual appliance equivalent to a plurality of appliances P25, A more complex appliance P25, such as a scanner/fax/printer, a photo-printing Minilab, or a videoconferencing appliance can be regarded as an appliance P25 or as a plurality of appliances P25.

Appliance Chain

Referring in particular to FIG. 1, a description will now be given of the concept of appliance chain P3. An appliance chain P3 is defined as a set of appliances P25. The concept of appliance chain P3 may also include a concept of order.

The following examples constitute appliance chains P3:
a single appliance P25,
an image-capture appliance and an image-restitution appliance,
a photo appliance, a scanner or a printer, for example in a photo-printing Minilab,
a digital photo appliance or a printer, for example in a photo-printing Minilab,
a scanner, a screen or a printer, for example in a computer,
a screen or projector, and the eye of a human being,
one appliance and another appliance which it is hoped can be emulated,
a photo appliance and a scanner,
an image-capture appliance and image-processing software,
image-processing software and an image-restitution appliance,
a combination of the preceding examples,
another set of appliances P25.

Defect

Referring in particular to FIG. 1, a description will now be given of the concept of defect P5. A defect P5 of appliance P25 is defined as a defect related to the characteristics of the optical system and/or of the sensor and/or of the electronic unit and/or of the software integrated in an appliance P25; examples of defects P5 include distortion, blurring, vignetting, chromatic aberrations, rendering of colors, flash uniformity, sensor noise, grain, astigmatism, spherical aberration.

Image

Referring in particular to FIG. 1, a description will now be given of the concept of image P2. Image P2 is defined as a digital image captured or modified or restituted by an appliance P25. Image P2 may originate from an appliance P25 of appliance chain P3. Image P2 may be addressed to an appliance P25 of appliance chain P3. More generally, image P2 may be derived from or addressed to appliance chain P3. In the case of animated images, such as video images, composed of a time sequence of fixed images, image P2 is defined as one fixed image of the sequence of images.

Formatted information

Referring in particular to FIG. 1, a description will now be given of the concept of formatted information P4. Formatted information P4 is defined as data related to the defects P5 of one or more appliances P25 of appliance chain P3 and enabling image-processing means P1 to modify the quality of images P2 by making allowance for the defects P5 of appliance P25. To produce the formatted information P4, there can be used various methods and systems based on measurements, and/or captures or restitution of references, and/or simulations.

To produce the formatted information P4, it is possible, for example, to use the method and the system described in the International Patent Application filed on the same day as the present application in the name of Vision IQ and entitled "Method and system for producing formatted information related to the defects of appliances of an appliance chain and formatted information addressed to image-processing means." That application describes a method for producing formatted information P4 related to the defects P5 of appliances P25 of an appliance chain P3. The formatted information P4 is addressed to image-processing means P1, in particular software, with a view to modifying the quality of the images processed by the image-processing means P1. Appliance chain P1 is composed in particular of at least one image-capture appliance and/or at least one restitution means and/or at least one observer. The method comprises the stage of producing data characterizing the defects P5 of the appliances P25 of appliance chain P3. The data are the formatted information P4.

To produce the formatted information P4, it is possible, for example, to use the method and the system described in the International Patent Application filed on the same day as the present application in the name of Vision IQ and entitled "Method and system for producing formatted information related to geometric distortions". That application describes a method for producing formatted information P4 related to the appliances P25 of an appliance chain P3. Appliance chain P3 is composed in particular of at least one image-capture appliance and/or at least one image-restitution appliance. The method includes the stage of producing formatted information P4 related to the geometric distortions of at least one appliance P25 of the chain.

Appliance P25 preferably makes it possible to capture or restitute an image on a medium. Appliance P25 contains at least one fixed characteristic and/or one variable characteristic depending on the image. The fixed characteristic and/or variable characteristic can be associated with one or more values of characteristics, especially the focal length and/or the focusing and their values of associated characteristics. The method includes the stage of producing, from a measured field, measured formatted information related to the geometric distortions of the appliance. The formatted information P4 may include the measured formatted information.

To produce the formatted information P4, it is possible, for example, to use the method and the system described in the International Patent Application filed on the same day as the present application in the name of Vision IQ and entitled "Method and system for producing formatted information related to the defects of at least one appliance of a chain, especially to blurring". That application describes a method for producing formatted information P4 related to the appliances P25 of an appliance chain P3. Appliance chain P3 is composed in particular of at least one image-capture appliance and/or at least one image-restitution appliance. The method includes the stage of producing formatted information P4 related to the defects P5 of at least one appliance P25 of the chain. Preferably; appliance P25 with which an image can be captured or restituted contains at least one fixed characteristic and/or one variable characteristic depending on the image (I). The fixed and/or variable characteristics can be associated with one or more values of characteristics, especially the focal length and/or the focusing and their values of associated characteristics. The method includes the stage of producing measured formatted information related to the defects P5 of appliance P25 from a measured field. The formatted information P4 may include the measured formatted information.

To provide the formatted information P4, it is possible, for example, to use the method and the system described in the International Patent Application filed on the same day as the present application in the name of Vision IQ and entitled "Method and system for providing formatted information in a standard format to image-processing means". That application describes a method for providing formatted information P4 in a standard format to image-processing means P1, especially software and/or components. The formatted information P4 is related to the defects P5 of an appliance chain P3. Appliance chain P3 includes in particular at least one image-capture appliance and/or one image-restitution appliance. Image-processing means P1 use the formatted information P4 to modify the quality of at least one image P2 derived from or addressed to appliance chain P3. Formatted information P4 includes data characterizing the defects P5 of the image-capture appliance, especially the distortion characteristics, and/or data characterizing the defects of the image-restitution appliance, especially the distortion characteristics.

The method includes the stage of filling in at least one field of the standard format with the formatted information P4. The field is designated by a field name. The field contains at least one field value.

To search for the formatted information P4, it is possible, for example, to use the method and the system described in the International Patent Application filed on the same day as the present application in the name of Vision IQ and entitled "Method and system for modifying the quality of at least one image derived from or addressed to an appliance chain". That application describes a method for modifying the quality of at least one image P2 derived from or addressed to a specified appliance chain. The specified appliance chain is composed of at least one image-capture appliance and/or at least one image-restitution appliance. The image-capture appliances and/or the image-restitution appliances being progressively introduced on the market by separate economic players belong to an indeterminate set of appliances. The appliances P25 of the set of appliances exhibit defects P5 that can be characterized by formatted information P4. For the image in question, the method includes the following stages:

the stage of compiling directories of the sources of formatted information related to the appliances P25 of the set of appliances, the stage of automatically searching for specific formatted information related to the specified appliance chain among the formatted information P4 compiled in this way, the stage of automatically modifying the image by means of image-processing software and/or image-processing components, while taking into account the specific formatted information obtained in this way.

To exploit the formatted information P4, it is possible, for example, to use the method and the system described in the International Patent Application filed on the same day as the present application in the name of Vision IQ and entitled "Method and system for calculating a transformed image from a digital image and formatted information related to a geometric transformation". That application describes a method for calculating a transformed image from a digital image and formatted information P4 related to a geometric transformation, especially formatted information P4 related to the distortions and/or chromatic aberrations of an appliance chain P3. The method includes the stage of calculating the transformed image from an approximation of the geometric transformation. It results therefrom that the calculation is economical in terms of memory resources, in memory bandpass, in calculating power and therefore in electricity consumption. It also results therefrom that the transformed image does not exhibit any visible or annoying defect as regards its subsequent use.

To exploit the formatted information P4, it is possible, for example, to use the method and the system described in the International Patent Application filed on the same day as the present application in the name of Vision IQ and entitled "Method and system for modifying a digital image, taking into account its noise". That application describes a method for calculating a transformed image from a digital image and formatted information P4 related to the defects P5 of an appliance chain P3. Appliance chain P3 includes image-capture appliances and/or image-restitution appliances. Appliance chain P3 contains at least one appliance P25. The method includes the stage of automatically determining the characteristic data from the formatted information P4 and/or the digital image. It results from the combination of technical features that the transformed image does not exhibit any visible or annoying defect, especially defects related to noise, as regards its subsequent use.

Image-processing Means

Referring in particular to FIG. 1, a description will now be given of the concept of image-processing means P1. Within the meaning of the present invention, image-processing means P1 are defined, for example, as software and/or a component and/or an equipment item and/or a system capable of modifying the quality of image P2 by employing formatted information P4 in order to produce a modified image. The modified image may be addressed to a second appliance of appliance chain P3, distinct or not from appliance P25, for example, the following appliance in appliance chain P3.

The modification of image quality by image-processing means P1 may consist, for example, in:

suppressing or attenuating the defects P5 of one or more appliances P25 of appliance chain P3 in image P2, and/or modifying image P2 to add at least one defect P5 of one or more appliances P25 of appliance chain P3 in such a way that the modified image resembles an image captured by appliance or appliances P25, and/or modifying image P2 to add at least one defect P5 of one or more appliances P25 of appliance chain P3 in such a way that the restitution of the modified image resembles an image restituted by appliance or appliances P25, and/or modifying image P2 by taking into account the formatted information P4 related to the vision defects P5 of the eye P25 of a human being in appliance chain P3 in such a way that restitution of the modified image is perceived by the eye of the human being as corrected for all or part of the defects P5.

A correction algorithm is defined as the method employed by an image-processing means P1 to modify image quality depending on the defect P5.

Image-processing means P1 may assume various forms depending on the application.

Image-processing means P1 may be integrated entirely or partly in appliance P25, as in the following examples:

an image-capture appliance that produces modified images, such as a digital photo appliance in which image-processing means P1 are integrated, an image-restitution appliance, which displays or prints modified images, such as a video projector in which image-processing means P1 are included, a hybrid appliance, which corrects the defects of its elements, such as a scanner/printer/fax machine in which image-processing means P1 are included, a professional image-capture appliance, which produces modified images, such as an endoscope in which image-processing means P1 are included.

In the case in which image-processing means P1 are integrated in appliance P25, appliance P25 in practice corrects its own defects P5, and the appliances P25 of appliance chain P3 can be determined by design, for example in a fax machine: a scanner and a printer; nevertheless, the user is able to use only part of the appliances P25 of appliance chain P3, for example if the fax machine can also be used as a stand-alone printer.

Image-processing means P1 can be integrated entirely or partly in a computer, for example in the following manner:

in an operating system, such as Windows or the Mac OS, in order to modify automatically the quality of images derived from or addressed to a plurality of appliances P25, which may vary depending on image P2 and/or in time, examples being scanners, photo appliances and printers; the automatic correction may be made, for example, when image P2 is input into the system, or when printing is requested by the user, in an image-processing application, such as Photoshop™, to modify automatically the quality of images derived from or addressed to a plurality of appliances P25, which may vary depending on image and/or in time, examples being scanners, photo appliances and printers; the automatic correction may be made, for example, when the user activates a filter command in Photoshop™, in a photo-printing appliance (such as Photofinishing or Minilab in English), to modify automatically the quality of images derived from a plurality of photo appliances, which may vary depending on the image and/or in time, examples being disposable cameras, digital photo appliances and compact disks, the automatic correction may take into account the photo appliances as well as the integrated scanner and printer, and may be applied at the moment at which the printing jobs are initiated, on a server, for example on the Internet, to modify automatically the quality of images derived from a plurality of photo appliances, which may vary depending on the image and/or in time, examples being disposable cameras and digital photo appliances, the automatic correction may take into account the photo appliances as well as a printer, for example, and may be applied at the moment at which the images P2 are recorded on the server, or at the moment at which the printing jobs are initiated.

In the case in which image-processing means P1 are integrated in a computer, image-processing means P1 are for practical purposes compatible with multiple appliances P25, and at least one appliance P25 of appliance chain P3 may vary from one image P2 to another.

Explanation of the Problem Solved by the Present Invention

Several economic players are involved in the majority of the cited image-processing means P1: manufacturers of image-capture appliances, software writers, manufacturers of restitution appliances.

In addition, various economic players will be capable of producing formatted information P4 related to the different appliances P25: the manufacturer of appliance P25, a specialized third party, the user of image-processing means P1.

In addition, image-processing means P1 may take the form of software executed on various types of hardware, especially when image-processing means P1 are integrated in appliance P25.

Finally, the formatted information P4 can be distributed and/or updated in various ways.
  delivered with image-processing means P1,
  delivered with appliance P25 (on a delivered compact disk, etc.),
  distributed in the same file as image P2 produced by the (image-capture) appliance P25,
  distributed by means of a central or distributed database.

In view of the number of economic players and above all of the number of users, it is not possible to force everyone to update image-processing means P1 simultaneously; thus not all users will be using the same version of image-processing means P1.

On the other hand, future appliances P25 appearing on the market may have defects P5 that are more complex or that depend on new variable characteristics. In this case it is inconceivable that all users can be requested to update image-processing means P1.

Finally, certain image-processing means P1 may take into account, for example, new defects P5, new image formats or a new parameterizable model P10. It will be necessary to be able to deploy new image-processing means P1 progressively while remaining compatible with the old image-processing means P1.

This explains the importance of a generic format with which formatted information P4 can be exchanged between the different players and the importance of making it possible for the various software programs to produce or use such information. It explains the importance of including, in the generic format according to the invention, the flexibility necessary for describing defects P5 of appliances P25 that have not yet been commercialized, in order to reduce the frequency of updating of image-processing means P1 and, in particular:
  to avoid having to distribute new image-processing means P1 when a new, for example more complex, appliance P25 arrives on the market, and
  to avoid having to upgrade image-processing means P1 in order to integrate them into a new appliance P25 containing a processor or component that has never been used previously in image-processing means P1.

With the objective of reducing the frequency of updating of image-processing means P1, the invention comprises mechanisms with which compatibility between formatted information P4 and image-processing means P1 can be assured in the course of time:
  in such a way that it is possible to produce formatted information P4 related to a new and even complex appliance P25, permitting existing image-processing means P1 to modify the quality of images P2 by taking into account formatted information P4 related to appliance P25, in such a way that the time between two updates of image-processing means P1 can be spaced apart,
  in such a way that the various economic players that produce appliances P25 and/or image-processing means P1 are able to update their products independently of the other economic players, even if the latter radically change the characteristics of their product or are unable to force their client to update their products,
  in such a way that a new functionality can be deployed progressively by starting with a limited number of economic players and pioneer users, while remaining compatible with already distributed image-processing means P1.

Variable

On the basis of FIG. 2, a description will now be given of the concept of variable P6. According to the invention, a variable characteristic P6 is defined as a measurable factor, which is variable from one image P2 to another that has been captured, modified or restituted by the same appliance P25, and which has an influence on defect P5 of the image that has been captured, modified or restituted by appliance P25, especially:
  a global variable, fixed for a given image P2, an example being a characteristic of appliance P25 at the moment of capture or restitution of the image, such characteristic being related to an adjustment of the user or to an automatic function of appliance P25,
  a local variable, variable within a given image P2, an example being coordinates x, y or rho, theta in the image, permitting image-processing means P1 to apply local processing that differs depending on the zone of the image.

A measurable factor variable from one appliance P25 to another but fixed from one image P2 to another that has been captured, modified or restituted by the same appliance P25 is not generally considered to be a variable characteristic P6. An example is the focal length for an appliance P25 with fixed focal length.

The formatted information P4 may depend on at least one variable P6.

By variable P6 there can be understood in particular:
  the focal length of the optical system,
  the redimensioning applied to the image (digital zoom factor: enlargement of part of the image; and/or undersampling: reduction of the number of pixels of the image),
  the nonlinear brightness correction, such as the gamma correction,
  the enhancement of contour, such as the level of deblurring applied by appliance P25,
  the noise of the sensor and of the electronic unit,
  the aperture of the optical system,
  the focusing distance,
  the number of the frame on a film,
  the underexposure or overexposure, the sensitivity of the film or sensor,
the type of paper used in a printer,
the position of the center of the sensor in the image,
the rotation of the image relative to the sensor,
the position of a projector relative to the screen,
the white balance used,
the activation of a flash and/or its power,
the exposure time,
the sensor gain,
the compression,
the contrast,
another adjustment applied by the user of appliance P25, such as a mode of operation,
another automatic adjustment of appliance P25,
another measurement performed by appliance P25.

Variable Value

On the basis of FIG. 2, a description will now be given of the concept of variable value P26. A variable value P26 is defined as the value of variable P6 at the moment of capture, modification or restitution of a specified image.

Correspondence Between A Variable and an Identifier, Correspondence Table, Number of Variables, Field, Field Value On the basis of FIGS. 2, 4 and 5, a description will now be given of the concept of correspondence P7, number P14 of variables, identifier P8, field P13 and field value P28. By means of formatted information P4, it is possible to establish, between a part of variables P6 and an identifier P8, a correspondence P7, for example by including a correspondence table P11 or a link to a table; the part of variables P6 may be chosen at the moment of production of formatted information P4, for example in such a way that the formatted information P4 makes it possible to modify image quality with specified precision; in fact, certain variables P6 may have a smaller influence than others on the defect P5, and so the error introduced by making the approximation that these are constant may merely be minimum; for example, the focusing adjustment may have only a slight influence on the vignetting defect, and for this reason may not be part of the variables P6 in correspondence P7 with an identifier P8. Formatted information P4 may also include the number P14 of variables of the part of the variables P6 in correspondence P7 with an identifier P8.

For example, identifiers P8 may include a type of source (Exif format, Twain format, etc.) and an identifier of field P13 adapted to the source (a number of field P13, the name of field P13, etc.).

Thus image-processing means P1 can determine the value P26 of a variable corresponding to identifier P8, especially in the case in which the physical significance and/or the content of the said variable P6 are known only after distribution of the said image-processing means P1.

In the case in which the source includes named fields P13, as in the example of the Exif format, correspondence P7 may be encoded by using the name of field P13 in such a way that image-processing means P1 can read a field value P28 defined after distribution of image-processing means P1, and can thus determine the variable value P26.

In this way the time between two updates of image-processing means P1 can be spaced apart; the various economic players that produce appliances P25 and/or image-processing means P1 can update their products independently of other economic players, even if the latter radically change the characteristics of their product or are unable to force their client to update their products; in such a way that a new functionality can be deployed progressively by starting with a limited number of economic players and pioneer users. In particular, in the example of photography, there are multiple economic players and extremely numerous users; it is therefore impossible to synchronize everyone.

For example, correspondence P7 between variables P6 and identifiers P8 may take the form of a correspondence table P11 that contains, for each variable P6, a type of source and an identifier of field P13 in the source. In this case, to determine the variable value P26, image-processing means P1 may, for example, launch a search within the source for one of the following fields P13:

in the case of a digital photo, a field P13 in Exif format in a file containing image P2,
in the case of a digital photo, a subfield P13 in the Maker-Note field of the Exif format in a file containing image P2,
a proprietary field P13 in a file containing image P2 to represent data such as a displacement of the image center or a rotation of the image relative- to the image derived from the sensor,
a field P13 derived from a scanner driver in the Twain format,
a field P13 derived from a printer driver,
a field P13 derived from data in XMP format,
a field P13 calculated from image P2 itself, such as the zoom factor applied to image P2, or such as the focal length.

As an example, correspondence table P11 for the formatted information P4 related to appliance P25 may indicate that variable P6 corresponds to field P13 Exif #212 or that variable P6 corresponds to Twain datum #35; in this way it is possible to find the value of variable P6 for a given image P2 by reading the field P13 Exif #212 in the header of the file containing image P2 derived from a digital photo appliance, or to find the value of variable P6 by requesting the value of Twain datum #35 from the Twain driver of a scanner, without having to know whether it relates to the focal length or to the temperature.

In this way it is possible to modify the quality of images P2, including those that were in existence prior to distribution of image-processing means P1, if a file containing image P2 also contains data such as field P13 Exif #212; to obtain the field value P28, a processing means uses identifier P8 to determine the name of field P13 and to determine the field value P28 from the file containing image P2, and thus to determine the variable value P26.

As an example, part of the variables P6 may correspond to a geometric deformation (especially a rotation, a translation or a digital zoom relative to the sensor) applied to image P2. Consequently, since defects P5 generally depend on the position on the sensor, any geometric transformation applied to an image between the sensor and the application of a correction algorithm must be taken into account in the value of the said part of the said variables P6, especially in the following cases:

in appliance P25, as a function of the zoom adjustment applied by the user, such as x1.5, a digital zoom may be applied with the effect of using only part of the surface of the optical system and of the sensor and of interpolating the value of the pixels of image P2,
in appliance P25, as a function of the adjustment applied by the user to choose the resolution of the image produced, such as 1280*1024 or 1200×1600, an interpolation is performed to obtain the value of the pixels of image P2, in appliance P25, as a function of the adjustment applied by the user to choose the shape of the image produced, such as 1:1.33 or 1:1.5, image P2 is cropped, before correction, a rotation or redimensioning may be applied by software, an image-processing means P1 may also modify the size of image P2; for example, a distortion-correction algorithm deforms the edges of a rectangular image P2 so that they are no longer rectangular, and it can apply a zoom factor or crop the edges of the image to restore its original size and shape.

It is therefore necessary to keep track of these processing operations and to combine these diverse items of information in order to obtain the variable values P26, in order to know, for example, the zoom factor applied to the image relative to the sensor and to the optical system, and this must be done before each algorithm for correction of a defect P5 in image-processing means P1.

In the case of an appliance chain P3, each appliance P25 has its inherent variables P6, such as the focal length.

Parameterizable Model, Parameters, Mathematical Function

Referring in particular to FIGS. 3 and 6, a description will now be given of the concept of parameters P9 and parameterizable model P10. Within the meaning of the invention, a parameterizable model P10 is defined as a mathematical model that can depend on variables P6 and is related to one or more defects P5 of one or more appliances P25; for example, a parameterizable model P10 can be related to:

the blurring of a digital photo appliance,
the vignetting of a photo appliance which it is wished to emulate,
the distortion and the chromatic aberrations of a projector,
the blurring of a disposable photo appliance combined with a scanner.

The formatted information P4 related to a defect P5 of an appliance P25 may be presented in the form of the parameters P9 of a parameterizable model P10 depending on variables P6; by means of the parameters P9 of parameterizable model P10, it is possible to identify a mathematical function P16 in a set of mathematical functions, such as multi-variable polynomials; by means of the mathematical functions P16, it is possible to modify image quality as a function of specified values of the variables P6.

Hereinafter LA1 and LA2 will be defined as image-processing means P1 distributed successively in the course of time and employing successive versions of the format of formatted information P4.

Each version of image-processing means P1 may correspond to an upgrade of the format of formatted information P4, or in other words of parameterizable models P10. Hereinafter IF1APi and IF2APi will be defined as items of formatted information P4 related to an appliance P25, defined as Api, distributed successively in the course of time and making use of successive versions of the format of formatted information P4.

Hereinafter APO will be defined as an appliance P25 commercialized before LA1 and AP3 as an appliance P25 commercialized after LA2. Variables P6 may correspond to physical attributes that can vary according to the type of appliance P25. For example, AP3 may be the first appliance P25 to have a distortion that depends on temperature, and so it had not been tested before LA2 was distributed.

Identification Elements for Parameterizable Models

Referring in particular to FIG. 3, a description will now be given of the concept of identification elements P12 for parameterizable models. Formatted information P4 can include, for parameterizable models, identification elements P12 related to the successively employed parameterizable models P29 in such a way that it is possible to identify the fraction of formatted information P4 related to parameterizable models P10 prior to the distribution of image-processing means P1, in such a way that upward compatibility exists between the items of formatted information P4, and in such a way that downward compatibility exists between the items of formatted information P4.

This concept of compatibility can be illustrated by the following examples:

example of upward compatibility: LA2 will be able to use IF1AP0 to correct all defects P5 present in IF1AP0,
example of downward compatibility: LA1 will be able to use part of IF2AP3 to correct the defects P5 taken into account by LA1 but not the defects P5 that have appeared more recently.

It is possible in particular to use the identification elements P12 for parameterizable models in order to place two representations related to the same appliance P25 in formatted information P4:

a representation compatible only with the most recent processing means P1, that makes it possible to modify image quality with good precision.
a representation compatible with old processing means P1, that makes it possible to modify image quality, albeit with poorer precision.

In this way it is possible to reduce the frequency of updating of image-processing means P1.

The following examples illustrate the reasons for which the parameterizable models P10 can vary in the course of time:

the said processing means P1 are updated to take into account a new defect P5 that cannot be represented effectively by existing parameterizable models P10,
a more flexible parameterizable model P10 is needed to represent a preexisting defect P5 of atypical appliances P25, even though other mechanisms exist for reducing this risk.

The following examples illustrate upgrades that could take place between the successively employed parameterizable models P29:

it is realized that, in order to correct the distortion defect P5 of a video projector, the automatic reframing used in the case of an image-capture appliance must be deactivated and the zones outside the zone corresponding to image P2 must be blacked out; this function can be employed by adding a parameter P9 into the formatted information P4 and by upgrading the distortion-correction algorithm included in image-processing means P1; for example, only LA2 will integrate this correction algorithm, and LA1 will therefore be unable to correct the distortions of a video projector.
addition of functionalities such as automatic reframing adjustment after correction of distortions or addition of a defect P5,
a new defect P5 such as color is added.

Generic Parameterizable Model, Elementary Mathematical Function, Encoding

Referring in particular to FIG. 6, a description will now be given of the concept of generic parameterizable model P17. The mathematical function P16 identified by the parameters P9 of parameterizable model P10 can be written, for example, in mathematical form:

$$r1, r2, \ldots, rP = f(v1, v2, \ldots, vQ),$$

where Q is the number of variables P14, v1 to vQ are the variables P6, f is the mathematical function P16, and r1 to rP are the results of mathematical function P16.

Mathematical function P16 can also be written in the form of a sequence of elementary mathematical functions, each having a single result:

$$ri=fi(wi1;\ldots;wiS),$$

where wi1 to wiS are parts of the variables P6, and i varies between 1 and P.

The following examples describe types of encoding, in a parameterizable model P10, of the parameters P9 that are related to an elementary mathematical function. The possibility of choosing an encoding among a plurality of encodings available at the moment of production of formatted information P4 makes it possible to produce formatted information P4 related to "every" type of appliance P25 of arbitrary complexity without changing image-processing means P1, even if the modification of image quality is a little slower for certain encodings.

An elementary mathematical function can be encoded in various ways in the formatted information P4, such as:
- in the form of a polynomial (for example: number of variables P14, with coefficients and power of the variables P6 for each term),
- in the form of measurement points, for example for a plurality of points: value of range of variables P6 for certain variables P6, and an elementary mathematical function of other variables P6,
- as a combination in the form of elementary mathematical functions, especially as a weighted sum,
- as a formal expression (example: v1^ v2+cos(v1)),
- as a program,
- as a program, encoded in Java language, for example, and independent of the processor used in image-processing means P1.

For example, the following encodings can be used to encode an elementary mathematical function f(x,y,t) or to encode an approximation of same as a sum of simple functions:
  encoding 1: the parameters P9 may include, especially in the case in which the elementary mathematical functions are polynomials containing a plurality of variables P6, a list αi, pxi, pyi, pti, of the coefficients of the terms of the said polynomial as well as of the powers of each variable P6 of each term, in such a way that $f(x,y,t)=\Sigma\alpha i\ x^{pxi}\ y^{pyi}\ t^{pti}$; for example, ((5,0,1,0, (9,1,1,1), (3,1,1,2)) is used to encode $5y+9xyt+2xyt^2$; the encoding may also include the number P14 of variables and the number of terms,
  encoding 2: there can be used other simple functions such as the terms of polynomials, examples being wavelet packets; some parameters P9 may describe the base used, others may describe the coefficients of the expansion of f(x,y,t) according to that base, and another may describe the number P14 of variables.

A generic parameterizable model P17 is defined as a parameterizable model P10 such that the parameters P9 of the said generic parameterizable model P17 make it possible to identify any mathematical function P16 whatsoever of the said variables P6, in such a way that it is possible to produce formatted information P4 related to the defects P5 of an appliance P25 of arbitrary complexity. In this case, the parameters P9 may include the number P14 of variables as well as, for example, in the case of a function f of 3 variables P6 x, y and t:
  encoding 3: a character string, such as $2*t*x^2+cos(y*t)*5^x$
  encoding 4: a list of values or of ranges of values, such as ((2, 3, 1, 12), (5, 6, 20.5, 7), . . . ) to represent points 12=f(2,3,1), 7=f(5,6,a) where a lies between 2 and 5, . . . ; in this case, it is possible to find, by interpolation, the values of other points that are absent from the list as the case may be; some parameters P9 may additionally describe the interpolation model to be used (linear, spline, etc.),
  encoding 5: instructions of a data-processing language, such as Java, with which the elementary mathematical function can be calculated,
  encoding 6: a list of ti, fi(x,y) to represent points f(x,y,ti)=fi(x,y), where fi are elementary mathematical functions of two variables P6 that can themselves be encoded according to any coding whatsoever; in this case it is possible to find, by interpolation, the values of other points for the other values of t that are absent from the list as the case may be; some parameters P9 may additionally describe the interpolation model to be used; in an alternative embodiment, ti may designate a range of values t for which f(x,y,t)=fi(x,y),
  encoding 7: list of αi, fi(x,y,z) to represent f(x,y,t)=Σαi fi(x,y,t), where fi are elementary mathematical functions of three variables P6 that can be encoded according to any encoding whatsoever.

The foregoing encodings were described with an example of a function containing 3 variables P6, but they may also be applied to any number of variables P6.

In the case in which the elementary mathematical function does not depend on any variable P6, there may be used another encoding defined as encoding 8, which is limited to a constant.

By virtue of the possibility of choosing the encoding at the moment of production of the formatted information P4, the defects P5 of any type of appliance P25, even if it is complex, can be described, thus making it possible to reduce the frequency of updating of imaging-processing means P1.

Encoding 4 can be used, for example, to represent, in formatted information P4, a raw measurement, such as a mathematical field related to distortion; this information can be defined as measured formatted information; encodings 1, 2, 3, 5 and 6 can then be calculated, for example by interpolation, to obtain formatted information P4, which can be defined as extended formatted information; finally, an encoding similar to encoding 7 can be calculated from encoding 6 once the value of part of the variables P6 has been determined.

Configuration Constants

A parameterizable model P10 may be such that certain elementary mathematical functions fi do not depend on any local variable; these elementary mathematical functions fi that do not depend on any local variable are defined as configuration constants that are independent of image P2. By means of these configuration constants that are independent of the image, it is possible to adapt the behavior of image-processing means P1 to modify image quality related to the defect P25 of an appliance P25.

Mathematical function P16 can therefore be expanded to a set of configuration constants that are independent of the image and a set of elementary mathematical functions.

Image-processing means P1 may be configured in various ways by means of configuration constants, part of which are the configuration constants that are independent of image P2. It is appropriate to classify the configuration constants according to the moment at which their value is chosen and the instant at which they are used.

The configuration constants can be used:
  at the moment at which the formatted information P4 is produced, an example being a calibration precision,
  at the moment at which the formatted information P4 is used by the image-processing means, an example being the order in which defects P5 are corrected.

Depending on the case, the configuration constants can have various forms:
  non-modifiable constants that are independent of appliance P25 and image P2, for example in a data-processing code,
  a configuration file containing constants that are independent of appliance P25 and image P2, for example in the .ini format,
  values P26 of variables dependent on appliance P25 and image P2,
  formatted information P4 containing configuration constants that are independent of image P2 and appliance P25, and elementary mathematical functions dependent on appliance P25 and image P2,
  a configuration file related to a user of image-processing means P1 and containing, for example, constants that are independent of appliance P25 and image P2.

The configuration constants can be determined:
  while the application software is being created (constants in the code, or encoding of algorithms),
  while the application software is being configured for a client (configuration file, for example),
  while the formatted information P4 is produced (which information is therefore independent of the image),
  while image capture or image restitution takes place by appliance P25,
  while the formatted information P4 is used by image-processing means P1.

In order to reduce the frequency of updating of image-processing means P1, it is preferable to use configuration constants that are independent of image P2 in the formatted information P4, which can be adapted to each appliance P25, instead of using non-modifiable constants or a configuration file.

In summary:
  the configuration constants of algorithms for producing formatted information P4 (such as the thresholds used to detect the calottes for distortion) are determined and used at the moment of production of the formatted information P4 (for example, via an .ini file),
  the non-modifiable configuration constants of image-processing means P1; they are determined, for example, at the moment of compilation of the software of image-processing means P1 and are used at the moment of the correction; to be avoided,
  the configuration constants that are independent of the image (such as the order in which correction takes place, the types of parameterizable models P10 used (polynomial or Java), the type of noise (analog or digital), the type of sensor (CMOS, CCD), the blurring model (isotropic or anisotropic), or the activation of automatic redimensioning of the image after a distortion correction) are determined at the moment of production of the formatted information P4 and are used by image-processing means P1; they are present in formatted information P4; they relate, for example, to modes of operation and to type of encoding depending on appliance P25,
  the correspondence P7 between variables P6 and identifiers P8 are determined at the moment of production of the formatted information P4 and are used by image-processing means P1; they are present in formatted information P4;
  the variable values P26 (such as the focal length) are determined at the moment of image capture or restitution and are used by image-processing means P1 (for example, via Exif, Twain, etc.),
  the configuration constants dependent on the client (such as an encryption key, etc.); they are determined at the time of delivery of image-processing means P1 and are used by image-processing means P1 (for example, they may be contained in a configuration file),
  the constants left to the choice of the user (such as the defects P5 to be corrected, the size of the final image); they are determined and used by image-processing means P1,
  the non-modifiable configuration constants of image-processing means P1; they are determined before delivery of image-processing means P1 and are used by image-processing means P1.

Identification Elements for the Type of Parameterizable Model

Referring in particular to FIG. 6, a description will now be given of the concept of identification elements P15 for the type of parameterizable model. The parameters P9 of parameterizable model P10 can then be presented in the form:
  of the representation in the form of encoding of elementary mathematical functions of variables P6,
  of identification elements P15 for the type of parameterizable model; they can be composed of the encodings used to represent the elementary mathematical functions.

Certain elementary mathematical functions may correspond to the configuration constants that are independent of the image.

A description will now be given of an alternative embodiment which makes it possible to introduce great compatibility of image-processing means P1 with the formatted information P4 related to an appliance P25 that was commercialized after distribution of image-processing means P1, making it possible to reduce the frequency of updating of image-processing means P1.

The correction algorithms see only the configuration constants that are independent of the image and only the elementary mathematical functions. The correction algorithms do not know the number or the nature of the global variables.

The correction algorithms do not know the value of the global variables.

The correction algorithms do not know which encoding was used for the elementary mathematical functions; they are merely able to calculate the value of such functions for values of local variables that they choose, the values of the global variables having been determined previously by using correspondence P7.

The correction algorithms do not know the nature or the type of appliances P25 of appliance chain P3.

The correction algorithms do not know which processing operations were applied previously to the image, and therefore do not know the order in which the correction algorithms were called.

In addition, there exists a plurality of other ways in which the correction algorithms of image-processing means P1 can be made generic with respect to the formatted information P4 related to a defect P5 of an appliance P25 distributed after image-processing means P1:

a slow way, which is very generic and may necessitate formatted information P4 that is not very compact, comprises the ability to code, in the formatted information P4, a data-processing program P18 having access to the variable values P26 and to the image P2, another way comprises the ability to include, in formatted information P4, at least one generic parameterizable model P17, coded in Java, for example, another way comprises providing a configuration constant independent of the image, making it possible to switch to a mode that may be slower, where the non-modifiable constants are replaced by configuration constants independent of the image, another way comprises using elementary mathematical functions systematically and not using any configuration constant independent of the image, another way comprises choosing local variables and elementary mathematical functions with which many characteristics of the defects P5 can be covered; for example, in the case of blurring, it is conceivable to choose a function f(x, y, z) for fixing an anisotropic node for each zone of the image, rather than choosing a function f(x) for fixing an isotropic node that is common to all zones of the image.

In this way it is possible to choose the type of each parameterizable model P10 at the moment of production of the said formatted information P4.

In this way it is possible to calculate, at the moment of modification of image quality, the said mathematical function P16 for the type of parameterizable model P10 used during production of formatted information P4.

An alternative embodiment may, for example, employ two types of parameterizable models P10, one of which uses encoding with polynomials while the other uses encoding with formal mathematical expressions.

The choice of type of model used at the moment of production of formatted information P4 may take into account, as a function of the application, the desired image quality produced by image-processing means P1, the calculation time, and the complexity of the parameterizable model P10 necessary for modeling the defects P5 of an appliance P25.

The formatted information P4 may also include data-processing programs P18 and/or links P19 to data-processing programs, in such a way that it is possible to distribute image-processing means P1 that call data-processing subprograms contained in the formatted information P4, making it possible to modify image quality, especially by processing defects P5 defined after distribution of the said processing means P1.

For example, data-processing program P18 may correct a defect P5 of image P2, or it may also perform only part of the processing operations, such as calculation of a mathematical function P16. In this case it is possible to define:

parameterizable model P10 as data-processing program P18, parameters P9 as the instructions of the said data-processing program P18.

By link P19 to data-processing programs, there may be understood in particular:

a remote call, an address permitting remote loading of a program.

For example, in the case of distortion, the correction algorithm may see two elementary mathematical functions fx(x,y) and fy(x,y) with which it is possible to calculate the coordinates of a point in the image corresponding to a point in the modified image, without knowing whether there exist variables P6 other than the local variables x and y.

The correction algorithm also sees configuration constants independent of the image, such as, for example:

activation of automatic reframing to obtain a modified rectangular image (activated in the case of a capture appliance but not in the case of a restitution appliance), activation of redimensioning of the modified image so that it has the same size as the image.

The correction algorithm does not possess any means of knowing the value of the focal length or the defects P5 already taken into account or the size of the test pattern used for calibration.

For example, in the case of distortion and chromatic aberration and of images P2 containing three color planes P20 in red, green and blue (RGB), the correction algorithm can see six elementary mathematical functions fxR(x,y), fyR(x,y), fxG(x,y), fyG(x,y), fxB(x,y), fyB(x,y), with which it is possible to calculate the coordinates of the point in a color plane P20 of image P2 corresponding to a point in the corresponding color plane P20 of the modified image, without knowing whether there exist variables P6 other than the local variables x and y.

The correction algorithm also sees configuration constants independent of the image, such as, for example:

activation of automatic reframing to obtain a modified rectangular image (activated in the case of a capture appliance but not in the case of a restitution appliance), activation of redimensioning of the modified image so that it has the same size as the image.

The correction algorithm does not possess any means of knowing the focal length or the defects P5 already taken into account or the size of the test pattern used for calibration.

For example, in the case of vignetting, the correction algorithm can see an elementary mathematical function $f(d^2)$ with which it is possible to calculate the gain to be applied to the brightness as a function of the square of the distance to a point defined as the center, without knowing whether there exist variables P6 other than the local variables d.

The correction algorithm also sees configuration constants independent of the image, such as, for example, the coordinates of the center.

The correction algorithm does not possess any means of knowing the focal length or the defects P5 already taken into account or the size of the test pattern used for calibration.

For example, in the case of blurring, the correction algorithm can see, for each color plane P20, two elementary mathematical functions fX(x,y), fY(x,y) with which it is possible to calculate, for a pixel block of position x,y, a node that is anisotropic in two axes X and Y, without knowing whether there exist variables P6 other than the local variables x and y.

The correction algorithm also sees configuration constants independent of the image, such as, for example, the noise model used (silver halide or digital technology).

The correction algorithm does not possess any means of knowing the focal length or the defects P5 already taken into account or the size of the test pattern used for calibration.

Preferably, the chosen correction algorithms avoid calling the elementary mathematical functions for each pixel. This makes it possible to use more generic and slower encodings, in the case of complex appliances P25. For example:

in the case of distortion and/or chromatic aberration, the elementary mathematical functions can be used only for the pixels of an array; between four points of the array, it is possible to use an interpolation which, for example, may be bilinear, in the case of vignetting, the elementary mathematical function may be used to calculate a table that is a function of $d^2$, in the case of blurring, the mathematical function may be used to calculate the node or nodes.

Color Image, Color Plane, Specified Color, Data Related to a Specified Color

Referring in particular to FIG. 7, a description will now be given of the concept of color image P21, of color plane P20, of specified color P22, and of data P23 related to a specified color. The alternative embodiment described hereinabove is applicable to the case in which image P2 is a color image P21. Color image P21 can be decomposed into color planes P20 in various ways: number of planes (1, 3 or more), precision (8 bits unsigned, 16 bits signed, floating, etc.) and significance of the planes (relative to a standard color space). Color image P21 can be decomposed in various ways into color planes P20: red, green, blue (RGB) or brightness, saturation, hue, etc.; on the other hand, color spaces such as PIM exist, or negative pixel values are possible in order to permit representation of subtractive colors, which cannot be represented in positive RGB; finally, it is possible to encode a pixel value on 8 bits or 16 bits, or by using floating values. The formatted information P4 includes data with which image P2 can be decomposed into color planes P20 compatible with the different defects P5 to be processed; each color plane P20 being characterized by a specified color P22; the said formatted information P4 containing data P23 related to the said specified color; the said data P23 related to the said specified color additionally making it possible to determine the fraction of the said formatted information P4 that can be employed appropriately to modify the quality of the said color plane P20; in such a way that the said image-processing means P1 can calculate the said color plane P20 for a specific color P22 defined after distribution of the said image-processing means P1; in such a way that the said image-processing means P1 can apply a particular processing operation, especially processing of a blurring level, for a specified color P22 defined after distribution of the said image-processing means P1; in such a way that it is then possible to reduce the frequency of updating of image-processing means P1.

As an example, the blurring of current appliances P25 can be corrected by using red, green and blue color planes P20; the method and system make it possible to correct the blurring of an appliance P25 for which decomposition into brightness and saturation would be better adapted.

In the case of an appliance P25 that is compatible with the PIM standard, it is possible, for example, to choose to work in positive color on 8 bits in X, Y, Z space or to work on 16 bits signed in RGB space.

Data Related to a Specified Defect

Referring in particular to FIG. 8, a description will now be given of the concept of data P24 related to a specified defect. The formatted information P4 can include data related to at least one specified defect P5, defined as data P24 related to a specified defect; by means of the data P24 related to a specified defect, it will be possible to determine the fraction of formatted information P4 that can be appropriately employed to modify image quality according to the said specified defect P5; in practice, the data P24 related to a specified defect will be able to take the form of an identifier for a correction algorithm capable of correcting the specified defect P5.

In such a way that image-processing means P1 are able to modify image quality by using formatted information P4 related to defects P5, of which at least one of the defects P5 was defined after distribution of the said image-processing means P1; in such a way that it is then possible to reduce the frequency of updating of image-processing means P1.

For example, IF2AP3 contains data related to distortion, vignetting and blurring; LA1 is able to correct only blurring; LA1 can correct blurring by using IF2AP3; the size of the node in this case must not depend on the zoom applied by distortion.

For example, if a version of image-processing means P1 is able to process distortion but not blurring, that version will be able to extract the formatted information P4 related to distortion and to process only this distortion.

Another advantage of an image-processing means P1 capable of processing a plurality of defects P5 is that the choice of defects P5 to be processed can be left to the user, within the limits related to order of events, as described hereinafter.

Alternative Embodiments

In addition, the following methods make it possible to reduce the frequency of updating of image-processing means P1:
  the formatted information P4 may include information that makes it possible to determine the order in which image-processing means P1 execute the correction algorithms, thus permitting the order best adapted to each appliance P25 to be chosen,
  the formatted information P4 may be independent of the type of processor (8, 16, 32, 64 bits, order of bytes in a word) used to produce or read it,
  the formatted information P4 may be stored in a file that also contains image P2 or in a database indexed by an identifier of appliance P25,
  in the case in which the formatted information P4 is registered in the image, an index can be included in the comment field, for example, to make it possible to indicate where the formatted information P4 (such as field type and field name) is located; as a result, it is possible to distribute image-processing means P1 compatible with a future standard for storage of formatted information P4 (a field in Exif format, a field in Tiff format, data in XMP format, comment field).

Example of Use of the Advantages of the Invention

To modify the quality of an image P2, image-processing means P1 may implement, for example, all or part of the following stages:
  determining the appliances P25 or identifiers of appliances P25 of appliance chain P3, for example by analyzing data associated with image P2 in a file containing image P2 or from image-loading means,
  searching for formatted information P4 related to the defects P5 of all or part of the appliances P25 of appliance chain P3, for example in the file containing image P2 or in a database, by using the identifiers obtained in this way for appliances P25,
  using the formatted information P4 to establish the correspondence P7 between the variables P6 and identifiers P8,
  determining the values P26 of variables having an influence on the defects P5, such as the focal length, by using the identifiers P8, for example by using Exif data present in the file containing image P2,
  combining the items of formatted information P4 of a plurality of appliances P25,
  selecting a part of the formatted information P4 that is compatible with the said image-processing means P1, by using the identification elements P12 for parameterizable model, selecting a part of the formatted information P4 related to a part of the defects P5, by using the data P24 related to a specified defect, loading the image P2 and decomposing it into color planes P20 according to the specified colors P22, identifying the mathematical functions P16 by using the parameters P9 of the parameterizable models P16 of the formatted information P4 obtained in this way, determining the configuration constants that are independent of the image and determining the elementary mathematical functions and their encoding from identification elements P15 for the type of parameterizable model and from mathematical function P16, determining the order of corrections from formatted information P4, modifying the quality of image P2 to obtain the modified image by using the correction algorithms in the order determined in this way, the configuration constants that are independent of the image, and the elementary mathematical functions; in applications for the general public, the modification of image quality must be robust, meaning that it is better to deactivate or attenuate a correction than to risk degrading image P2: for example, it is better to remove a little less blurring, but not to degrade the noise; also better are colors that are slightly less warm but nevertheless appear natural.

In this alternative embodiment, the formatted information P4 may be produced for complex appliances P25 that were not known at the time of distribution of image-processing means P1, without the need to update image-processing means P1. An example of formatted information P4 is given below:

appliance P25:
identifier of the appliance,
version of the formatted information related to the appliance, such as a date,
type of formatted information P4 (measured formatted information, extended formatted information, etc.),
identification element P12 for parameterizable models:
parameterizable model 2.0,
parameterizable model 2.1,
formatted information P4 related to parameterizable model 2.0
loading of the image: 16 bits signed, specified colors P22=RGB,
correspondence P7: v1=Exif #212; v2=zoom and cropping obtained from a table that is a function of image size,
order of corrections: distortion, blurring,
distortion correction: c1; f3(v1,*,*); f5(v2,*); 8 bit RGB output,
blurring correction: c2; f2(v1,*,*),
formatted information P4 related to parameterizable model 2.1
elementary mathematical functions:
f1:3 variables P6, encoding 1, terms: {(12.5;0;3;4); (199; 1;1;1)},
f2:3 variables P6, encoding 6, points: {(12.2; f3); (45.4; f4)},
...
configuration constants:
c1: 3; 2.5.

Application of the Invention to Cost Reduction

Cost reduction is defined as a method and system for lowering the cost of an appliance P25 or of an appliance chain P3, especially the cost of the optical system of an appliance or of an appliance chain, wherein the method comprises:

reducing the number of lenses, and/or
simplifying the shape of the lenses, and/or
designing an optical system having defects P5 that are larger than those desired for the appliance or the appliance chain; or choosing same from a catalog, and/or
using materials, components, processing operations or manufacturing methods that are less costly for the appliance or the appliance chain and that add defects P5.

The method and system according to the invention can be used to lower the cost of an appliance or of an appliance chain: it is possible to design a digital optical system, to produce formatted information P4 related to the defects P5 of the appliance or of the appliance chain, to use this formatted information to enable image-processing means P1, whether they are integrated or not, to modify the quality of images P2 derived from or addressed to the appliance or to the appliance chain, in such a way that the combination of the appliance or the appliance chain with the image-processing means is capable of capturing, modifying or restituting images of the desired quality at reduced cost.

The invention claimed is:

1. A method for correcting image data of an external imaging device in an image processing apparatus to reduce maintenance cycles of the image processing apparatus, the method comprising:

obtaining, by the image processing apparatus, formatted information related to the external imaging device, the formatted information including a correspondence table that includes information that indicates a first configurable processing model corresponding to at least a first attribute of the external imaging device from a plurality of attributes of the external imaging device and other external imaging devices, each of the attributes corresponding to a software element of a respective external imaging device that results in at least one predetermined variable defect being applied to digital images captured by the respective external imaging device, such that the first attribute results in a first predetermined variable defect being applied to digital images captured by the external imaging device;

receiving, by the image processing apparatus from the external imaging device, a first digital image captured by the external imaging device separate from the formatted information, wherein the first digital image includes the first predetermined variable defect, which is caused by the first attribute of the external imaging device;

determining a first identifier from the correspondence table of the formatted information, wherein the first identifier corresponds to a variable of a measurable factor that varies amongst the digital images captured by the external imaging device, the variable influences a variable defect of the digital images and influences the first predetermined variable defect included in the first digital image, the first identifier identifies a field including a value of the variable, said field is included in the first digital image or in a file that includes the first digital image, and said field is not included in the correspondence table;

determining a second identifier from the formatted information to locate the first configurable processing model for the first attribute by the information included in the formatted information, from a plurality of configurable processing models for the plurality of attributes of the external imaging device, to correct the first predetermined variable defect of the first digital image;

after said step of determining the first identifier, determining, by reading, in the first digital image or in the file that includes the first digital image, the field identified by the first identifier, including the value of the variable corresponding to the first digital image; and correcting, by the image processing apparatus, the first predetermined variable defect of the first digital image by executing the first configurable processing model, as identified by the second identifier, in accordance with the value of the variable corresponding to the first digital image, as identified by the first identifier.

2. The method for correcting image data according to claim 1, wherein the first identifier includes a version field to identify a version of the software element of the external imaging device that corresponds to the first attribute, the method further comprising:

updating the software element of the external imaging device with a new version; and updating the version field to reflect the new version of the software element of the external device after said step of updating the software element.

3. The method for correcting image data according to claim 1, wherein the first identifier includes a version field to identify a version of the software element of the external device that corresponds to the first attribute, the method further comprising:

updating the version field to reflect a prior version of the software element, in a case where the first digital image was received prior to the software element being updated to a new version.

4. The method for correcting image data according to claim 1, wherein the processing models each include a mathematical function dedicated to adapt a quality of a digital image.

5. The method for correcting image data according to claim 1, wherein the formatted information further includes at least one of a data processing program or a link to access the data processing program.

6. The method for correcting image data according to claim 1, wherein said correcting the received digital image further comprises:

modifying the color quality of at least one color plane of the first digital image based on the variable.

7. The method for correcting image data according to claim 1, wherein the correcting further comprises:

correcting a blurring level of the first digital image based on the value of the variable.

8. The method for correcting image data according to claim 1, wherein the first predetermined variable defect is related to characteristics of at least one of an optical system, a sensor, an electronic unit, and a software integrated in the external imaging device, and the first predetermined variable defect is at least one of distortion, blurring, vignetting, chromatic aberration, rendering of colors, flash uniformity, sensor noise, grain astigmatism, and spherical aberration.

9. The method for correcting image data according to claim 1, wherein the variable includes a global variable that applies to an entirety of the first digital image and corresponds to a state of the external imaging device at a time when the external device captured the first digital image, and a local variable that applies to a portion of the first digital image, and varies between portions of the first digital image.

10. The method for correcting image data according to claim 9, wherein:

the variable includes at least one of a focal length of an optical system of the external imaging device, a redimensioning applied to the first digital image, a gamma correction, noise, an aperture of the optical system, a focusing distance, an underexposure or overexposure, a sensitivity of a sensor of the external imaging device, a rotation of the first digital image relative to the sensor, a white balance, whether or not a flash of the external imaging device was used during the capturing of the digital image, an exposure time, a sensor gain, a compression, and a contrast.

11. The method for correcting image data according to claim 1, wherein each of the attributes correspond to only a software element of a respective external imaging device that results in at least one predetermined variable defect being applied to digital images captured by the respective external imaging device.

12. A system for correcting image data of an external imaging device to reduce maintenance cycles of an image processing apparatus, the system comprising:

a receiver configured to receive formatted information related to the external imaging device, the formatted information including a correspondence table that includes information that indicates a first configurable processing model corresponding to at least a first attribute of the external imaging device from a plurality of and/or versions attributes of the external imaging device and other external imaging devices, each of the plurality of types and/or versions of attributes corresponding to a software element of a respective external imaging device that results in at least one predetermined variable defect being applied to digital images captured by the respective external imaging device, such that the first attribute results in a first predetermined variable defect being applied to digital images captured by the external imaging device, and configured to receive a first digital image captured by the external imaging device separate from the formatted information, wherein the first digital image includes the first predetermined variable defect, which is caused by the first attribute of the external imaging device; and a processor configured to:

determine a first identifier from the correspondence table of the formatted information, wherein the first identifier corresponds to a variable of a measurable factor that varies amongst the digital images captured by the external imaging device, the variable influences a variable defect of the digital images and influences the first predetermined variable defect included in the first digital image, and the first identifier identifies a field including a value of the variable, said field is included in the first digital image or in a file that includes the first digital image, and said field is not included in the correspondence table, determine a second identifier from the formatted information to locate the first configurable processing model for the first attribute by the information included in the formatted information, from a plurality of configurable processing models for the plurality of attributes of the external imaging device, to correct the first predetermined variable defect of the first digital image, determine, after the processor has determined the first identifier and the field, by reading, in the first digital image or in the file that includes the first digital image, the field identified by the first identifier, including the value of the variable corresponding to the first digital image, and correct the first predetermined variable defect of the first digital image by executing the first configurable processing model, as identified by the second identifier, in accordance with the value of the variable corresponding to the first digital image, as identified by the first identifier.

13. The system for correcting image data according to claim 12, wherein the first identifier includes a version field to identify a version of the software element of the external imaging device that corresponds to the first attribute, the processor further configured to:
update the software element of the external imaging device with a new version; and
update the version field to reflect the new version of the software element of the external imaging device after the software element has been updated.

14. The system for correcting image data according to claim 12, wherein the first identifier includes a version field to identify a version of the software element of the external device that corresponds to the first attribute, the processor further configured to:
update the version field to reflect a prior version of the software element, in a case where the first digital image was received prior to the software element being updated to a new version.

15. The system for correcting image data according to claim 12, wherein the processing models each include a mathematical function dedicated to adapt a quality of a digital image.

16. The system for correcting image data according to claim 12, wherein the formatted information further includes at least one of a data processing program or a link to access the data processing program.

17. The system for correcting image data according to claim 12, wherein said processor is further configured to:
modify the color quality of at least one color plane of the first digital image based on the variable.

18. The system for correcting image data according to claim 12, wherein said processor is further configured to:
correcting a blurring level of the first digital image based on the value of the variable.

19. The system for correcting image data according to claim 12, wherein the first predetermined variable defect is related to characteristics of at least one of an optical system, a sensor, an electronic unit, and a software integrated in the external imaging device, and the first predetermined variable defect is at least one of distortion, blurring, vignetting, chromatic aberration, rendering of colors, flash uniformity, sensor noise, grain astigmatism, and spherical aberration.

20. The system for correcting image data according to claim 12, wherein the processor is further configured to determine the value of the variable by retrieving the value from a field of the first digital image, the field being specified by the determined first identifier of the variable according to a type of the first digital image.

21. The system for correcting image data according to claim 12, wherein each of the attributes correspond to only a software element of a respective external imaging device that results in at least one predetermined variable defect being applied to digital images captured by the respective external imaging device.

* * * * *